United States Patent [19]

Bard et al.

[11] Patent Number: 5,157,938
[45] Date of Patent: Oct. 27, 1992

[54] THREE-STAGE SORPTION TYPE CRYOGENIC REFRIGERATION SYSTEMS AND METHODS EMPLOYING HEAT REGENERATION

[75] Inventors: Steven Bard, Northridge; Jack A. Jones, Los Angeles, both of Calif.

[73] Assignee: The United States of America as represented by the Administrator of the National Aeronautics and Space Administration, Washington, D.C.

[21] Appl. No.: 781,520

[22] Filed: Oct. 22, 1991

[51] Int. Cl.⁵ .............................................. F25B 1/00
[52] U.S. Cl. ...................................... 62/335; 62/434; 62/467
[58] Field of Search .......................... 62/467, 335, 434

[56] References Cited

U.S. PATENT DOCUMENTS

| | | | |
|---|---|---|---|
| 4,697,425 | 10/1987 | Jones | 62/467 X |
| 4,831,829 | 5/1989 | Jones | 62/467 X |
| 4,875,364 | 10/1989 | Jones | 62/467 |
| 5,063,747 | 11/1991 | Jones | 62/467 X |

OTHER PUBLICATIONS

Jones, J. A. and Blue, G. D., "Oxygen Chemisorption Compressor Study J-T Refrigeration"; AIAA 1558 (1987).

Primary Examiner—Alan Cohan
Attorney, Agent, or Firm—John H. Kusmiss; Thomas H. Jones; Guy M. Miller

[57] ABSTRACT

A three-stage sorption type cryogenic refrigeration system, each stage containing a fluid having a respectively different boiling point. Each stage includes a compressor in which a respective fluid is heated to be placed in a high pressure gaseous state. The compressor for that fluid which is heated to the highest temperature is enclosed by the other two compressors to permit heat to be transferred from the inner compressor to the surrounding compressors. The system may include two sets of compressors, each having the structure described above, with the interior compressors of the two sets coupled together to permit selective heat transfer therebetween, resulting in more efficient utilization of input power.

23 Claims, 3 Drawing Sheets

THREE-STAGE SORPTION TYPE CRYOGENIC REFRIGERATION SYSTEMS AND METHODS EMPLOYING HEAT REGENERATION

ORIGIN OF THE INVENTION

The invention described herein was made in the performance of work under a NASA contract, and is subject to the provisions of Public Law 96-517 (35 U.S.C. 202) in which the Contractor has elected not to retain title.

DESCRIPTION

1. Technical Field

The invention relates generally to cryogenic refrigeration systems, and particularly to refrigeration systems utilizing sorption compressors.

2. Background of the Invention

Such refrigerators have been particularly useful in aerospace environments such as on board a space satellite where longevity of the refrigerator is of utmost importance and sensitive equipment must be cooled without vibrational disturbance.

Refrigeration systems employing non-mechanical compressors, generally referred to as sorption refrigerators, employ either a physical adsorption (physisorption) system or a chemical absorption (chemisorption) system.

A chemisorption refrigerator, providing cooling in the temperature range of 55° to 100° K. is disclosed in U.S. Pat. No. 4,697,425 to Jones. The refrigerant used in U.S. Pat. No. 4,697,425 is oxygen.

Briefly, in a chemisorption system such as the one disclosed in U.S. Pat. No. 4,697,425, a sorbent material reversibly chemically reacts with oxygen to absorb oxygen at a relatively low first temperature and pressure. When heated to a second temperature, the sorbent releases oxygen at high pressure. A container is provided to contain the oxygen while it is heated. Once an amount of oxygen is adequately pressurized an outlet valve provided on the container is opened to direct the pressurized oxygen away from the sorbent material. The oxygen is then subjected to precooling and directed to the high pressure side of a high pressure/low pressure orifice (Joule-Thomson) expansion valve. Cooling takes place when the pressurized oxygen expands into the low pressure side of the orifice. The oxygen at this point is typically in both gas and liquid phases at a low temperature. A liquid/gas transition chamber is provided for collecting the liquid oxygen. The liquid oxygen is used for cooling such as for the cooling of an infrared sensor. The liquid oxygen, by absorbing heat from the to-be-cooled material, will then boil and leave the transition chamber. On its return path to the containers for chemical absorption onto cooled absorbent material, the oxygen's temperature will be raised from the low temperature to the first temperature. By providing two or more containers and alternately heating and cooling the containers, a continuous source of high pressure high temperature oxygen may be provided.

U.S. Pat. No. 4,831,829 of Jones and Schember, discloses a physisorption-type refrigerator. This physisorption-type refrigerator provides cooling in the temperature range of 120° to 160° K.

The operation of a physisorption refrigerator such as disclosed in U.S. Pat. No. 4,831,829 can be summarized as follows. A refrigerant (in this case krypton) is precooled and physically adsorbed onto the cavity walls of a porous adsorption material, at a first temperature. Charcoal or another high surface area adsorbing matrice is generally used as the adsorption material. The sorbent (charcoal) and refrigerant (krypton) are then heated to a higher second temperature while the refrigerant is trapped in the sorbent. The pressure of the trapped refrigerant rises with the temperature and the refrigerant is driven off the sorbent surface. The refrigerant is then subjected to precooling and passed through a Joule-Thomson (J-T) expansion valve to decrease its pressure. The refrigerant at this point is typically both in liquid and gas phases at a low temperature. The liquid is collected into a liquid/gas transition chamber where the refrigerant begins reverting back to a gaseous phase by absorbing heat from a to-be-cooled heat source (refrigeration load). After leaving the transition chamber the temperature of the refrigerant is then raised from the low temperature to the first temperature and the refrigerant is readsorbed onto the cavity walls of the sorbent.

Chemisorption refrigeration systems and physisorption refrigeration systems have different temperature ranges of operation and therefore may be advantageously employed together to provide cooling over a broader temperature range. A two stage refrigeration system using a methane physisorption upper stage to precool an oxide chemisorption lower state is illustrated in FIG. 1 in Jones, J.A. and Blue, G.D., Oxygen Chemisorption Compressor Study for Cryogenic J-T refrigeration, AIAA 1558 (1987), (incorporated herewith by reference). As shown in FIG. 1 of that article, a self-contained charcoal/methane upper stage provides precooling to 140° K. for a self-contained oxide chemisorption lower stage. As shown schematically in FIG. 1 the stages operate independently, in side-by-side fashion. Only the low temperature portion of the upper stage is in contact with portion of lower stage to provide precooling of the oxygen.

One of the primary disadvantages of sorption refrigeration systems has been their unusually high power requirements when compared to conventional mechanical refrigeration cooling systems. A two-stage oxide/krypton sorption refrigerator could be expected to require about 155 watts of heat to produce 1 watt of cooling at 65° K. This compares with about 60 watts of power for a mechanical refrigerator.

A further development in this field is disclosed in U.S. Pat. No. 4,875,346 to Jones, et al. This patent discloses a refrigeration system employing two coupled sorption stages including a krypton physisorption stage in which krypton is cooled to liquid form at 135° K. and is used to precool oxygen, which is subsequently cooled to a liquid stage at 65°-80° K. To achieve such cooling levels, both fluids must be precooled to 200° K., which normally requires some form of active cooling. The patent discloses that this precooling may be performed by means of a thermoelectric cooler. To achieve the desired cooling level, the oxygen compressor must be heated to a peak temperature of 600° C. with an associated pressure of 22 atmospheres or above. The krypton and oxygen compressors are thermally coupled so that heat expelled during cooling of the interior of the oxygen compressor is utilized to heat the fluid in the krypton compressor. With this heat regeneration system, the patent indicates that the system has a total power requirement of 95 watts of heat for producing 1 watt of cooling to provide a working fluid at 65° K. However, the patent further states that this net power value excludes the power required to achieve precooling at 200° K.

STATEMENT OF THE INVENTION

Accordingly, it is an object of the present invention to achieve further improvements in the power conversion efficiency of such a refrigeration system.

Another object of the invention is to permit cooling of a fluid to a working temperature of the order of 65° K. without requiring the use of a thermal electric cooling unit.

Another object of the invention is to increase the operating reliability and service life of such a system.

Yet another object of the invention is to reduce the thermal and pressure stresses imposed on the heaters and containers forming part of such a system.

The above and other objects are achieved, according to the present invention, by a refrigeration method comprising: heating a first heat exchange fluid having a first boiling point to a selected temperature above the first boiling point in order to place the first fluid in a high pressure gaseous state, cooling the first fluid from the high pressure gaseous state to a high pressure liquid state, and then reducing the pressure of the first fluid to convert the first fluid from the high pressure liquid state to a low pressure liquid state; heating a second heat exchange fluid having a second boiling point lower than the first boiling point to a selected temperature above the second boiling point in order to place the second fluid in a high pressure gaseous state, cooling the second fluid from the high pressure gaseous state to a high pressure liquid state by heat exchange with the first fluid in its low pressure liquid state, and then reducing the pressure of the second fluid to convert the second fluid from the high pressure liquid state to a low pressure liquid state; and heating a third heat exchange fluid having a third boiling point lower than the second boiling point to a selected temperature above the third boiling point in order to place the third fluid in a high pressure gaseous state, cooling the third fluid from the high pressure gaseous state to a high pressure liquid state, by heat exchange with the second fluid in its low pressure liquid state, and then reducing the pressure of the third fluid to convert the third fluid from the high pressure liquid state to a low pressure liquid state.

The objects according to the invention are further achieved by a refrigeration system comprising:

a first heat exchange circuit comprising: a mass of a first heat exchange fluid having a first boiling point; means for heating the first heat exchange fluid to a selected temperature above the first boiling point in order to place the first fluid in a high pressure gaseous state; means for cooling the first fluid from the high pressure gaseous state to a high pressure liquid state; and means for reducing the pressure of the first fluid to convert the first fluid from the high pressure liquid state to a low pressure liquid state;

a second heat exchange circuit comprising: a mass of a second heat exchange fluid having a second boiling point lower than the first boiling point; means for heating the second fluid to a selected temperature above the second boiling point in order to place the second fluid in a high pressure gaseous state; means for cooling the second fluid from the high pressure gaseous state to a high pressure liquid state by heat exchange with the first fluid in its low pressure liquid state; and means for reducing the pressure of the second fluid to convert the second fluid from the high pressure liquid state to a low pressure liquid state; and a third heat exchange circuit comprising: a mass of a third heat exchange fluid having a third boiling point lower than the second boiling point; means for heating the third heat exchange fluid to a selected temperature above the third boiling point in order to place the third fluid in a high pressure gaseous state; means for cooling the third fluid from the high pressure gaseous state to a high pressure liquid state by heat exchange with the second fluid in its low pressure liquid state; and means for reducing the pressure of the third fluid to convert the third fluid from the high pressure liquid state to a low pressure liquid state.

Figure 3:
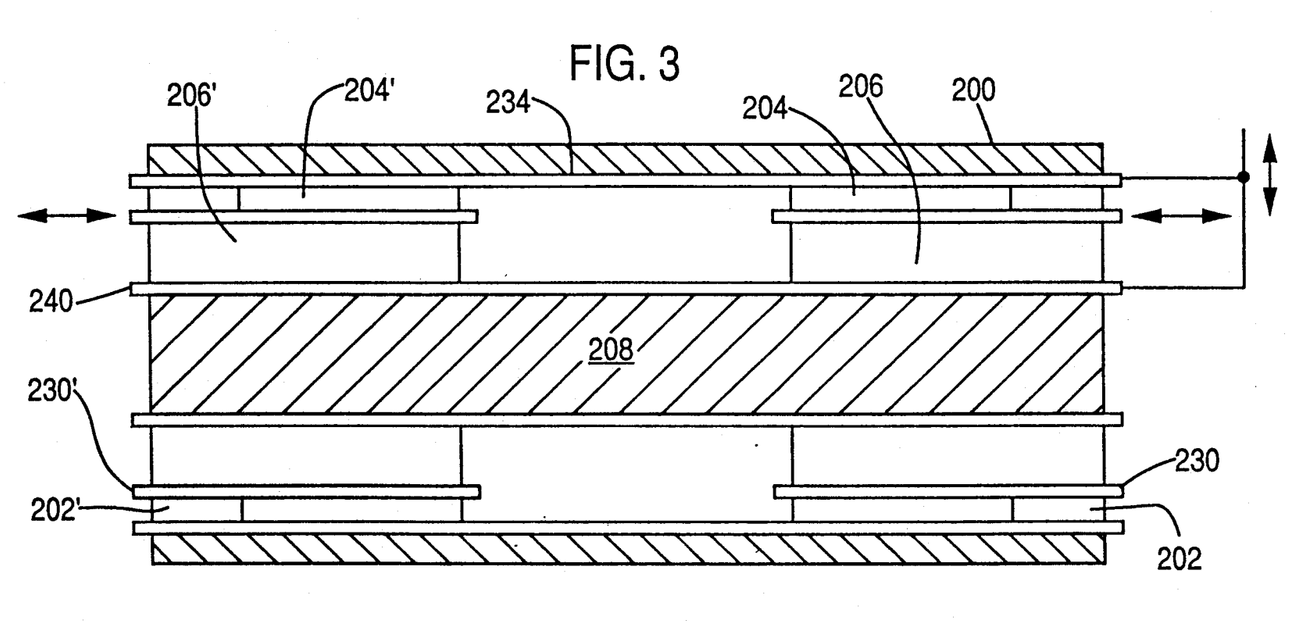
FIG. 3 is a view similar to that of FIG. 2 showing another embodiment of a compressor stage composed of a coupled pair of concentric regenerative compressors according to the invention.

Thus, one cycle of operation takes place as follows. Each cycle can be divided into four phases and will be described with reference to chambers 202, 204 and 206. At the start of the cycle, the interior of chamber 206 is assumed to be at its maximum temperature, while the interior of chambers 202 and 204 are at their minimum temperatures. During the first phase, 234 and 240 are filled with conductive fluid and gaps 230 and 230' are evacuated. At the end of the first phase, the interiors of chambers 206 and 206' are at substantially the same temperature. Then, during the second phase, gaps 234 and 240 are evacuated and gap 230 is filled with thermally conductive fluid, while gap 230' remains evacuated. During this phase, heat transfer occurs between chamber 206 and each of chambers 202 and 204, while heating power supplied to the heaters in chamber 206' to heat the sorbent and fluid therein to the maximum desired temperature. At the end of the second phase, the interior of chamber 206 is at its minimum desired temperature. Then, during the third phase, gaps 234 and 240 are filled while both gaps 230 and 230' are evacuated so that heat is transferred from chamber 206' to chamber 206. Finally, during the fourth phase, gaps 230, 234 and 240 are evacuated, while gap 230' is filled with conductive fluid and heating power is supplied to the heaters in chamber 206. Also during the fourth phase, heat transfer occurs from chamber 206' to chambers 202' and 204' in order to heat the fluids in the latter chambers to their maximum desired temperatures. At the end of the fourth phase, the supply of heating power to the heaters associated with chamber 206 is halted and a new operating cycle commences.

DETAILED DESCRIPTION OF THE INVENTION

The following description is of the best presently contemplated mode for carrying out the present invention. It is to be understood that this description is provided for the purpose of illustrating the general principles of the invention and not for the purpose of limiting the scope of the invention. The scope of the invention is better defined by reference to the accompanying claims.

Figure 1:
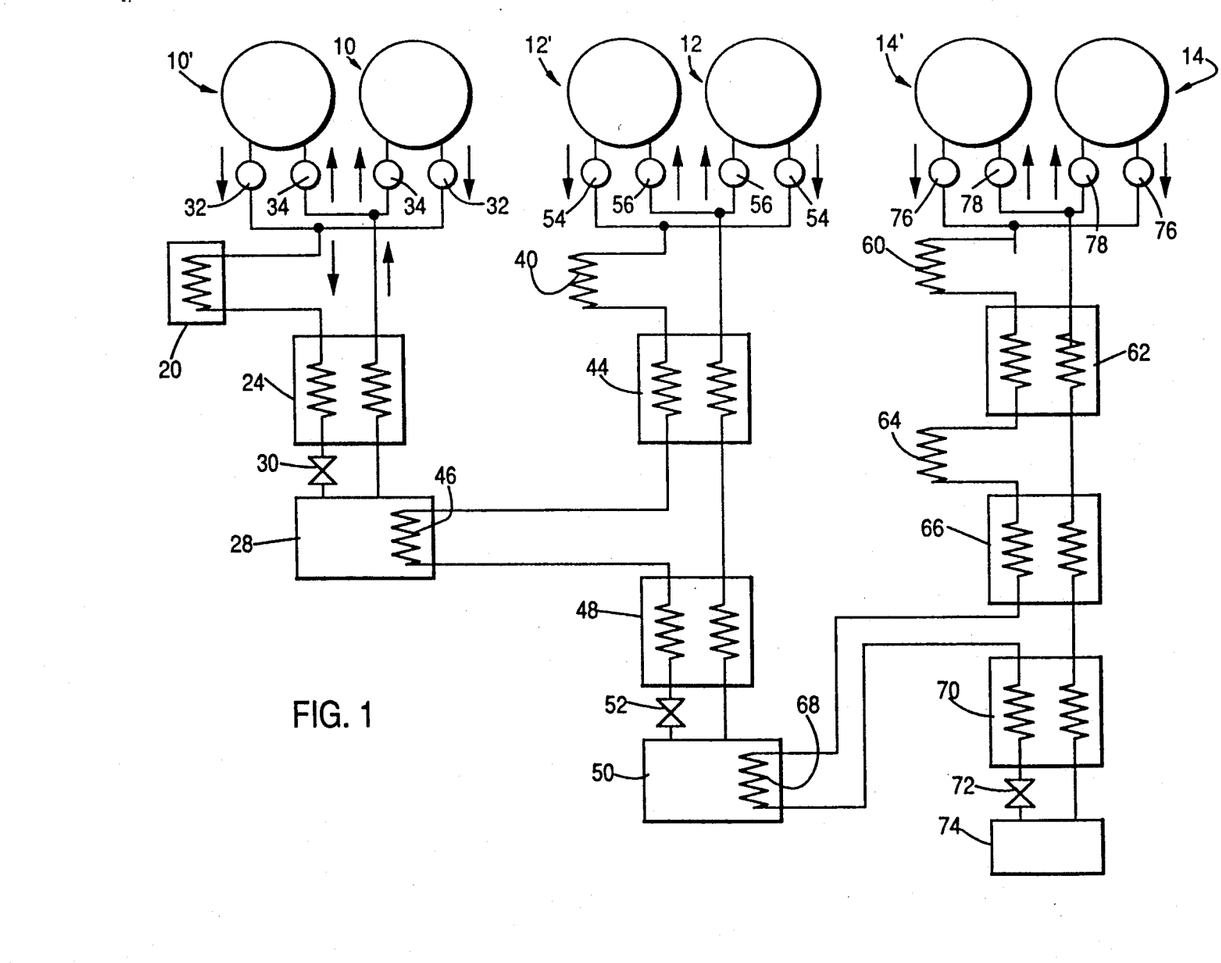
FIG. 1 is a schematic diagram of a preferred embodiment of a sorption refrigeration system according to the present invention.

FIG. 1 illustrates schematically the structural features of a three-stage sorption refrigeration system according to the present invention. This system will include at least one set of sorption compressors 10, 12 and 14, each provided with a fluid having a respectively different boiling point. Specifically in the arrangement shown in FIG. 1, the fluid associated with compressor 10 would have a first boiling point, the fluid associated with compressor 12 would have a boiling point lower than that of the fluid of compressor 10 and the fluid associated with compressor 14 would have a lower boiling point than that of the compressor 12. However, in accordance with principles already well known in the art, a preferred embodiment of the invention would further include a second set of compressors 10', 12' and 14' which are to be operated essentially in an alternating manner relative to their associated compressors 10, 12 and 14 in order to permit a continuous delivery of each refrigerant fluid.

A separate circuit is provided for each fluid. Thus, the circuit for the first fluid, contained in compressors 10 and 10', includes a radiator 20, a counterflow heat exchanger 24 and a liquid/gas transition chamber 28. Fluid flows from heat exchanger 24 to chamber 28 via a first Joule-Thomson (J-T) valve 30. Temperature conditions are established within the first circuit such that the first fluid is introduced into chamber 28, via valve 30, in a low temperature, low pressure state. This temperature is lower than that of the surrounding environment, so that as the liquid in chamber 28 boils, the resulting gaseous phase is conducted back through heat exchanger 24 and to compressors 10 and 10'. Compressors 10 and 10' are connected in parallel to the previously described circuit via outlet check valves 32 and inlet check valves 34.

Each compressor is associated with heating means which are operated in such a manner as to heat fluid which is present in one compressor so that the fluid is placed at a high pressure and flows through radiator 20, where it is cooled sufficiently to be placed in its liquid state, while under relatively high pressure. This fluid is then further cooled in heating exchanger 24 and expanded in J-T valve 30, to enter chamber 28, while still in its liquid state, and at a relatively low pressure. Thus, the flow through valve 30 serves to reduce the temperature of the fluid while maintaining it in its liquid state. As fluid in chamber 28 absorbs heat from the outside, it is converted back to its gas state and flows back through heat exchanger 24 and into one of compressors 10 and 10'.

The second gas flows through a circuit which is connected to compressors 12 and 12' and which includes a radiator 40, a first countercurrent heat exchanger 44, a heat exchange portion 46 in which the second fluid flows in thermal contact with the first fluid, in chamber 28, to cool the second fluid sufficiently to place it in its liquid state, while still at a relatively high pressure, and a second countercurrent heat exchanger 48. The second fluid is delivered to a second liquid/gas transition chamber 50 via a second J-T valve 52.

Gas which is formed during heating of the liquid in chamber 50 flows back through heat exchangers 48 and 44 and into one of compressors 12 and 12'. Here again, the second circuit includes outlet check valves 54 and inlet check valves 56.

Compressors 14 and 14' for the third fluid are associated with a circuit which includes a radiator 60, a first heat exchanger 62, a cooling element 64 which is preferably in thermal communication with the first fluid when in its liquid state in chamber 28, a second heat exchanger 66, a heat exchange portion 68 via which the third fluid is placed in heat exchange communication with the second fluid in chamber 50. As a result, the third fluid is cooled sufficiently to be placed in its liquid state, while remaining at a relatively high pressure. In this state, the third liquid flows through a third countercurrent heat exchanger 70 and then through a third J-T valve 72 into a third liquid/gas transition chamber 74. Transition chamber 74 contains a body of the third fluid in its liquid state and at a pressure such that the third fluid is at the temperature required to perform the intended cooling operation.

As with the first and second circuits, fluid flow to and from compressors 14 and 14' occurs via outlet check valves 76 and inlet check valves 78.

According to a preferred embodiment of the invention, the first fluid may be xenon, the second fluid krypton and the third fluid oxygen. Compressors 10, 10', 12 and 12' each contain a carbon sorption matrix, while compressors 14 and 14' contain a PCO sorption matrix. If radiators 20, 40 and 60 each effect cooling to 250° K., and liquid state temperatures of 165° K. for xenon, 120° K. for krypton and 65° K. for oxygen, compressors 14 and 14' can be operated so as to heat the oxygen to a peak temperature of 500° C. at a peak pressure of 1180 kPa. This temperature and pressure are substantially lower than those required by the known systems to also establish a refrigeration temperature of 65° K. Such lower pressure and temperature values reduce the stresses experienced by the compressors and help to promote a longer service life for the system, and particularly for the heaters and container materials.

When the conditions described above are created, the minimum temperature and pressure in each compressor 14 and 14' could be set at 285° C. and 2.3 kPa. Correspondingly, the maximum and minimum temperature and pressure conditions in each compressor 10 and 10' would be 250° C. and 2590 kPa; and −13° C. and 101 kPa, while for the krypton gas in compressors 12 and 12', these values would be 250° C. and 1430 kPa; and −13° C. and 103 kPa.

Figure 2:
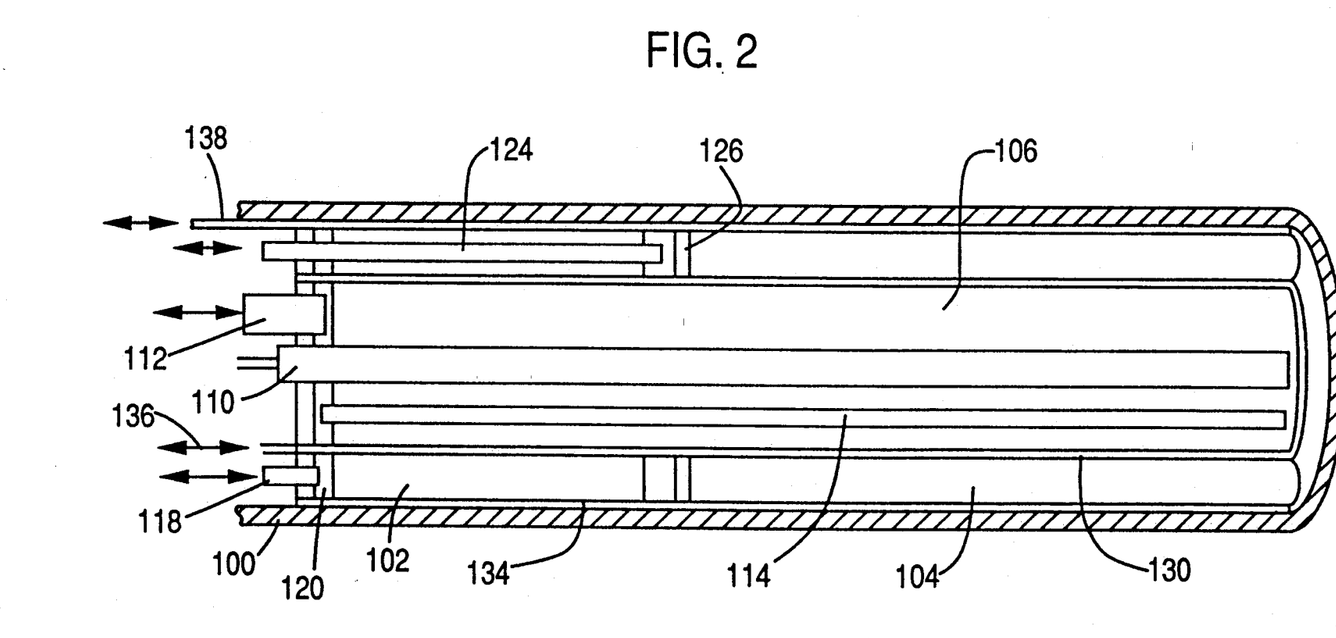
FIG. 2 is a simplified cross-sectional view of one embodiment of one regenerative compressor group which may be employed in the embodiment of FIG. 1.

A preferred embodiment of a compressor set according to the present invention is illustrated in FIG. 2 and includes a housing, or casing, 100 which also serves as a radiator in communication with the surrounding environment. Within casing 100 there are disposed several containers, which include a first fluid compressor chamber 102, a second fluid compressor chamber 104 and a third fluid compressor chamber 106. Chambers 102 and 104 are annular chambers containing a carbon matrix, while chamber 106 contains a PCO matrix and is enclosed by annular chambers 102 and 104. At the center of compressor 106 there is disposed an electrically powered heater cartridge 110.

The flow of oxygen to and from the interior of compressor 106 occurs via conduit 112 and a delivery pipe 114. Similarly, the flow of fluid to and from compressor 102 occurs via a conduit 118 and a filter element 120 and the flow of fluid to and from compressor 104 occurs via conduit 124 and a filter 126.

In order to control the transfer of heat within the structure shown in FIG. 2, there are provided a first gas gap 130 which is interposed between compressor 106 on the one hand and compressors 102 and 104, on the other hand, and a second gas gap 134 which is interposed between compressors 102 and 104, on the one hand, and radiator 100 on the other hand. The transfer of heat is controlled by conveying, in an appropriate timed sequence, a suitable thermally conductive gas, to and from, each of gas gaps 130 and 134 via respective conduits 136 and 138. The thermally conductive gas may be helium, for example, supplied at a pressure of the order of 5-10 Torr.

In an embodiment composed of three fluid circuits as illustrated in FIG. 1 and provided with two compressor groups, each constructed as shown in FIG. 2, and employing the specific fluids and compressor temperature and pressure conditions described above, a working fluid can be maintained at 65° K. in chamber 74 when radiators 20, 40 and 60 are 250° K. radiators, i.e. are exposed to a medium which cools the fluid flowing through the radiator to 250° K. In the prior art system disclosed in U.S. Pat. No. 4,875,346, it was necessary to initially cool the gaseous state fluids leaving the compressor to 200° K., which normally required that the radiators be constituted by a thermal electric cooler stage.

The three stage system according to the present invention allows the krypton to be brought to a temperature of 120° K. because, prior to pressure reduction in valve 52, the krypton can be cooled to 165° K. by the liquified xenon. The lower temperature of the krypton, in turn, improves the operating efficiency of the oxygen circuit.

The net result of the provision of three cooling stages in a system according to the present invention, combined with transfer of heat from the oxygen stage to the other two stages is a significant overall improvement in system power efficiency to an extent such that systems for creating working temperatures of 65° K. become competitive with mechanical Stirling coolers. Moreover, systems of the type contemplated by the present invention create lower levels of vibration and electromagnetic interference than do Stirling coolers. Thus, a sorption cooler according to the present invention is ideal for applications such as high resolution precision-pointing imaging instruments.

Moreover, elimination of the need for a thermoelectric cooler offers further advantages because such coolers increase the complexity of system integration and have a lower degree of reliability than do sorption compressor systems.

Furthermore, in a system according to the present invention, having the structural features illustrated in FIGS. 1 and 2 and described above, the oxygen compressors provide more waste heat than required by the krypton and xenon compressors, so that the krypton and xenon compressors can be made oversized to provide additional net cooling at 120° K. and 165° K. without requiring additional power input. Such excess upper stage cooling could advantageously be employed for cooling optics or instrument housings. In the specific system described above, it is possible to achieve a power efficiency of the order of 91-92 watts per watt of cooling. This represents approximately a 20% improvement over the efficiency which can be achieved with a system of the type disclosed in U.S. Pat. No. 4,875,346.

Operation of the system as illustrated in FIGS. 1 and 2 proceeds as follows. With gas gap 130 evacuated, i.e. nonconducting, and gas gap 130 filled with conductive gas, heater 110 is activated to heat the interior of compressor 14 (106) under time and temperature conditions selected to drive substantially all of the oxygen out of the compressor via conduits 112 and 114. During this same time period, the interiors of compressors 10 (102) and 12 (104) are being cooled so that their internal pressure is lowered sufficiently to cause gaseous xenon and krypton, respectively, to be drawn into those compressors from chambers 28 and 50, respectively.

At the end of this period, the supply of heat to the interior of compressor 14 (106) is halted, gas gap 130 is filled with thermally conducting fluid and gas gap 134 is evacuated so that heat is transferred from compressor 14 (106) to compressors 10 (102) and 12 (104). The fluids in the latter compressors are then heated so as to increase the pressure therein, resulting in the expulsion of fluid in the gaseous state.

The second compressor set, composed of compressors 10', 12' and 14', which may have a structure identical to that shown in FIG. 2, is operated in direct phase opposition to the operation of compressors 10, 12 and 14, resulting in a substantially constant flow of fluid in all three circuits.

The number of compressor sets can be made greater than two, and their heating and cooling cycles can be time shifted relative to one another to produce a more uniform continuous fluid flow in each circuit.

A further embodiment of the compressor unit of the system of FIG. 1, which provides a more efficient utilization of input power is illustrated in FIG. 3. As will be explained, the compressor structure shown in FIG. 3 is composed essentially of two compressor sets and includes a cylindrical housing, or casing, 200 which also serves as a radiator in communication with the surrounding environment. Within casing 200 there are disposed two first fluid compressor chambers 202 and 202', two second fluid compressor chambers 204 and 204' and two third fluid compressor chambers 206 and 206'. All of the compressor chambers are annular in form, chambers 202, 202', 204 and 204' contain a carbon matrix, and chamber 206 and 206' contain a PCO matrix. All of the illustrated chambers are annular in form, chambers 202 and 204 surround chamber 206 and chambers 202' and 204' surround chamber 206'.

A heat conducting member, preferably a solid metal rod 208, for example of copper, extends between the two sets of compressors and within the regions enclosed by chambers 206 and 206'. The purpose of member 208 is to transfer heat between chambers 206 and 206' so that heat being emitted from one of those chambers during cooling of its contents is employed to assist in heating the other chamber. This mode of operation is particularly advantageous in a system of the type contemplated by the present invention since during normal operation of the system the interior of one chamber 206, 206' is to be heated while the interior of the other chamber is being cooled.

The structure further includes gas gaps 230 and 230' between chamber 206 and chambers 202 and 204, and between chamber 206' and chambers 202' and 204', respectively, as well as a gas gap 234 between chambers 202, 204, 202' and 204', on the one hand, and casing 200 on the other hand. These gaps correspond to gas gaps 130 and 134, respectively, of the embodiment of FIG. 2 and are operated in the same sequence as gas gaps 130 and 134. There is provided a further gas gap 240 between member 208, on the one hand, and chambers 206 and 206', on the other hand. As in the embodiment of FIG. 2, all gas gaps are annular in form. Moreover, as shown in FIG. 3, gas gap 240 will be filled and evacuated in unison with gas gap 234.

The structure is completed by a plurality of heaters, for example three cartridge heaters, in each of chambers 206 and 206'. These heaters, which are not shown, may be conventional devices and may be equispaced about the circumference of each associated chamber. Finally, the ends of the structure are preferably enclosed by protective covers which also serve to thermally insulate the chambers.

As will be explained in greater detail below, the operation of the assembly in FIG. 3 is essentially the same as that of a pair of the assemblies shown in FIG. 2, with the principle essential difference being that in the embodiment of FIG. 3, power is supplied to the heaters associated with each chamber 206, 206' during approximately only half of the time required for supplying operating power to the heater of each assembly shown in FIG. 2, the balance of the heat for each of chambers 206 and 206' being conducted from the other one of those chambers via thermally conductive member 208. Gas gap 240 is filled with conductive fluid when no power is being supplied to any of the heaters and is evacuated when power is being supplied to the heaters associated with one of chambers 206 and 206'. Filling and evacuation of gas gap 234 occurs in unison with filling and evacuation of gap 240. Gap 230 is filled only during the time that gaps 234 and 240 are evacuated and no power is being supplied to the heaters associated with chamber 206. Correspondingly, gap 230' is filled only when gaps 234 and 240 are evacuated and no power is being supplied to the heaters associated with chamber 206'.

During the time periods when all heaters are off and gap 240 is filled with thermally conductive fluid, the fluids in chambers 206 and 206' are brought to substantially the same temperature, which is the average temperature of member 208. As in the case of two assemblies each having the form shown in FIG. 2, in the embodiment of FIG. 3 the heating and cooling cycles associated with chambers 202, 204 and 206 occur in phase opposition to those of chambers 202', 204' and 206'.

Gap 240 is common to both sets of compressor chambers because it is filled with thermally conductive fluid only when heat is being transferred between chambers 206 and 206'. Gap 234 may be common to both sets of compressor chambers because during each period when heat is being transferred from, for example, chambers 202 and 204 to casing 200, the interiors of chambers 202' and 204' are already at their minimum temperature.

The maximum and minimum temperatures and pressures in all of the chambers shown in FIG. 3 may be the same as those for corresponding chambers of the embodiment of FIG. 2, as described earlier herein. Under the specific temperature conditions described earlier herein, the equalization temperature of chambers 206 and 206', i.e. the average temperature of member 208, would be of the order of 390° C.

When the system illustrated in FIG. 1 is implemented with the compressor unit of FIG. 3, the power consumption can be reduced to 60 watts per watt of cooling, at least for systems dimensioned to produce between 0.25 and 1 watt of cooling to produce a working fluid having a temperature of 65° K. in an environment which allows radiators 20, 40 and 60 to be 250° K. radiators. Moreover, such an embodiment offers all of the other advantages described above with reference to FIG. 2.

It will be appreciated that the invention can be implemented with fluids other than those specified herein, the selection depending, for example, on the desired final temperature and the ambient temperature.

The invention may be embodied in other specific forms without departing from the spirit or essential characteristics thereof. The present embodiments and examples are, therefore, to be considered in all respects as illustrative and not restrictive, the scope of the invention being indicated in the appended claims, and all changes which come within the scope and equivalency of the claims are, therefore, intended to be embraced therein.

What is claimed:

1. A refrigeration method comprising:
   heating a first heat exchange fluid having a first boiling point to a selected temperature above the first boiling point in order to place the first fluid in a high pressure gaseous state, cooling the first fluid from the high pressure gaseous state to a high pressure liquid state, and then reducing the pressure of the first fluid to convert the first fluid from the high pressure liquid state to a low pressure liquid state;
   heating a second heat exchange fluid having a second boiling point lower than the first boiling point to a selected temperature above the second boiling point in order to place the second fluid in a high pressure gaseous state, cooling the second fluid from the high pressure gaseous state to a high pressure liquid state by heat exchange with the first fluid in its low pressure liquid state, and then reducing the pressure of the second fluid to convert the second fluid from the high pressure liquid state to a low pressure liquid state;
   heating a third heat exchange fluid having a third boiling point lower than the second boiling point to a selected temperature above the third boiling point in order to place the third fluid in a high pressure gaseous state, cooling the third fluid from the high pressure gaseous state to a high pressure liquid state, by heat exchange with the second fluid in its low pressure liquid state, and then reducing the pressure of the third fluid to convert the third fluid from the high pressure liquid state to a low pressure liquid state, and, before said step of cooling the third fluid, pre-cooling the third fluid to a low temperature gaseous state by heat exchange with the first fluid in its low pressure liquid state.

2. A method as defined in claim 1 wherein said steps of heating the first and second heat exchange fluids are carried out by transferring heat from the third heat exchange fluid while in its high pressure gaseous state.

3. A refrigeration method comprising:
   heating a first heat exchange fluid having a first boiling point to a selected temperature above the first boiling point in order to place the first fluid in a high pressure gaseous state, cooling the first fluid from the high pressure gaseous state to a high pressure liquid state, and then reducing the pressure of the first fluid to convert the first fluid from the high pressure liquid state to a low pressure liquid state;
   heating a second heat exchange fluid having a second boiling point lower than the first boiling point to a selected temperature above the second boiling point in order to place the second fluid in a high pressure gaseous state, cooling the second fluid from the high pressure gaseous state to a high pressure liquid state by heat exchange with the first fluid in its low pressure liquid state, and then reducing the pressure of the second fluid to convert the second fluid from the high pressure liquid state to a low pressure liquid state; and heating a third heat exchange fluid having a third boiling point lower than the second boiling point to a selected temperature above the third boiling point in order to place the third fluid in a high pressure gaseous state, cooling the third fluid from the high pressure gaseous state to a high pressure liquid state, by heat exchange with the second fluid in its low pressure liquid state, and then reducing the pressure of the third fluid to convert the third fluid from the high pressure liquid state to a low pressure liquid state, wherein said steps of heating the first and second heat exchange fluids are carried out by transferring heat from the third heat exchange fluid while in its high pressure gaseous state.

4. A method as defined in claim 3 wherein said steps of heating the first, second and third fluids are performed in three respective sorption compressors and the sorption compressors for the first and second fluids surround the sorption compressor for the third fluid.

5. A method as defined in claim 4 wherein there are two sorption compressors for the third fluid, and said step of heating the third fluid is performed in each of the two sorption compressors in alternation and comprises thermally coupling the two sorption compressors for the third fluid in order to transfer heat to the compressor in which the heating step is being performed to the other compressor.

6. A refrigeration method comprising:

heating a first heat exchange fluid having a first boiling point to a selected temperature above the first boiling point in order to place the first fluid in a high pressure gaseous state, cooling the first fluid from the high pressure gaseous state to a high pressure liquid state, and then reducing the pressure of the first fluid to convert the first fluid from the high pressure liquid state to a low pressure liquid state;

heating a second heat exchange fluid having a second boiling point lower than the first boiling point to a selected temperature above the second boiling point in order to place the second fluid in a high pressure gaseous state, cooling the second fluid from the high pressure gaseous state to a high pressure liquid state by heat exchange with the first fluid in its low pressure liquid state, and then reducing the pressure of the second fluid to convert the second fluid from the high pressure liquid state to a low pressure liquid state; and heating a third heat exchange fluid having a third boiling point lower than the second boiling point to a selected temperature above the third boiling point in order to place the third fluid in a high pressure gaseous state, cooling the third fluid from the high pressure gaseous state to a high pressure liquid state, by heat exchange with the second fluid in its low pressure liquid state, and then reducing the pressure of the third fluid to convert the third fluid from the high pressure liquid state to a low pressure liquid state, wherein said step of heating the third fluid is performed in two sorption compressors and is performed in each of the two sorption compressors in alternation and comprises thermally coupling the two sorption compressors for the third fluid in order to transfer heat to the compressor in which the heating step is being performed to the other compressor.

7. A method as defined in claim 1 wherein the third fluid is oxygen.

8. A method as defined in claim 7 wherein the first and second fluids are, respectively, xenon and krypton.

9. A method as defined in claim 7 wherein said step of heating the third fluid is carried out to heat the third fluid to a peak temperature of the order of 500° C.

10. A refrigeration system comprising:

a first heat exchange circuit comprising: a mass of a first heat exchange fluid having a first boiling point; means for heating the first heat exchange fluid to a selected temperature above the first boiling point in order to place the first fluid in a high pressure gaseous state; means for cooling the first fluid from the high pressure gaseous state to a high pressure liquid state; and means for reducing the pressure of the first fluid to convert the first fluid from the high pressure liquid state to a low pressure liquid state;

a second heat exchange circuit comprising: a mass of a second heat exchange fluid having a second boiling point lower than the first boiling point; means for heating the second fluid to a selected temperature above the second boiling point in order to place the second fluid in a high pressure gaseous state; means for cooling the second fluid from the high pressure gaseous state to a high pressure liquid state by heat exchange with the first fluid in its low pressure liquid state; and means for reducing the pressure of the second fluid to convert the second fluid from the high pressure liquid state to a low pressure liquid state; and a third heat exchange circuit comprising: a mass of a third heat exchange fluid having a third boiling point lower than the second boiling point; means for heating the third heat exchange fluid to a selected temperature above the third boiling point in order to place the third fluid in a high pressure gaseous state; means for cooling the third fluid from the high pressure gaseous state to a high pressure liquid state by heat exchange with the second fluid in its low pressure liquid state; and means for reducing the pressure of the third fluid to convert the third fluid from the high pressure liquid state to a low pressure liquid state, wherein said means for heating in each said heat exchange circuit is a sorption compressor.

11. A refrigeration system as defined in claim 10 wherein said sorption compressors of said first and second circuits comprise annular fluid storage chambers surrounding said sorption compressor of said third circuit, and said means for heating one of said first and second fluids comprises heat exchange means for transferring heat from the third fluid in the high pressure gaseous state to one of the first and second fluids.

12. A refrigeration system as defined in claim 11 wherein said means for heating said first and second fluids each comprises a respective one of said heat exchange means.

13. A refrigeration system as defined in claim 11 wherein said third circuit further comprises means for pre-cooling the third fluid from the means for heating the third fluid to a low temperature gaseous state by heat exchange with the first fluid in its low pressure liquid state.

14. A refrigeration system comprising:

a first heat exchange circuit comprising: a mass of a first heat exchange fluid having a first boiling point; means for heating the first heat exchange fluid to a selected temperature above the first boiling point in order to place the first fluid in a high pressure gaseous state; means for cooling the first fluid from the high pressure gaseous state to a high pressure liquid state; and means for reducing the pressure of the first fluid to convert the first fluid from the high pressure liquid state to a low pressure liquid state;

a second heat exchange circuit comprising: a mass of a second heat exchange fluid having a second boiling point lower than the first boiling point; means for heating the second fluid to a selected temperature above the second boiling point in order to place the second fluid in a high pressure gaseous state; means for cooling the second fluid from the high pressure gaseous state to a high pressure liquid state by heat exchange with the first fluid in its low pressure liquid state; and means for reducing the pressure of the second fluid to convert the second fluid from the high pressure liquid state to a low pressure liquid state; and a third heat exchange circuit comprising: a mass of a third heat exchange fluid having a third boiling point lower than the second boiling point; means for heating the third heat exchange fluid to a selected temperature above the third boiling point in order to place the third fluid in a high pressure gaseous state; means for cooling the third fluid from the high pressure gaseous state to a high pressure liquid state by heat exchange with the second fluid in its low pressure liquid state; and means for reducing the pressure of the third fluid to convert the third fluid from the high pressure liquid state to a low pressure liquid state, wherein said third circuit further comprises means for pre-cooling the third fluid from the means for heating the third fluid to a low temperature gaseous state by heat exchange with the first fluid in its low pressure liquid state.

15. A refrigeration system comprising:

a first heat exchange circuit comprising: a mass of a first heat exchange fluid having a first boiling point; means for heating the first heat exchange fluid to a selected temperature above the first boiling point in order to place the first fluid in a high pressure gaseous state; means for cooling the first fluid from the high pressure gaseous state to a high pressure liquid state; and means for reducing the pressure of the first fluid to convert the first fluid from the high pressure liquid state to a low pressure liquid state;

a second heat exchange circuit comprising: a mass of a second heat exchange fluid having a second boiling point lower than the first boiling point; means for heating the second fluid to a selected temperature above the second boiling point in order to place the second fluid in a high pressure gaseous state; means for cooling the second fluid from the high pressure gaseous state to a high pressure liquid state by heat exchange with the first fluid in its low pressure liquid state; and means for reducing the pressure of the second fluid to convert the second fluid from the high pressure liquid state to a low pressure liquid state; and a third heat exchange circuit comprising: a mass of a third heat exchange fluid having a third boiling point lower than the second boiling point; means for heating the third heat exchange fluid to a selected temperature above the third boiling point in order to place the third fluid in a high pressure gaseous state; means for cooling the third fluid from the high pressure gaseous state to a high pressure liquid state by heat exchange with the second fluid in its low pressure liquid state; and means for reducing the pressure of the third fluid to convert the third fluid from the high pressure liquid state to a low pressure liquid state, wherein said means for heating in said third heat exchange circuit comprises two sorption compressors and heat exchange means coupled between said compressors for transferring heat from fluid in one compressor to fluid in the other compressor.

16. A refrigeration system as defined in claim 15 wherein said heat exchange means comprise a solid thermally conductive member and controllable heat transfer members for transferring heat between said thermally conductive member and fluid in each said compressor.

17. A refrigeration system as defined in claim 15 wherein said means for heating in each of said first and second circuits comprise two sorption chambers each having an annular form and surrounding a respective compressor of said third circuit heat exchange means.

18. A method as defined in claim 3 wherein the third fluid is oxygen.

19. A method as defined in claim 18 wherein the first and second fluids are, respectively, xenon and krypton.

20. A method as defined in claim 16 wherein said step of heating the third fluid is carried out to heat the third fluid to a peak temperature of the order of 500° C.

21. A method as defined in claim 6 wherein the third fluid is oxygen.

22. A method as defined in claim 21 wherein the first and second fluids are, respectively, xenon and krypton.

23. A method as defined in claim 21 wherein said step of heating the third fluid is carried out to heat the third fluid to a peak temperature of the order of 500° C.

* * * * *